(12) United States Patent
Kang et al.

(10) Patent No.: US 9,894,644 B2
(45) Date of Patent: Feb. 13, 2018

(54) METHOD FOR TRANSRECEIVING DOWNLINK CONTROL INFORMATION AND APPARATUS FOR SAME

(71) Applicant: KT CORPORATION, Gyeonggi-do (KR)

(72) Inventors: Seunghyun Kang, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 75 days.

(21) Appl. No.: 15/024,862

(22) PCT Filed: Sep. 2, 2014

(86) PCT No.: PCT/KR2014/008216
§ 371 (c)(1),
(2) Date: Mar. 25, 2016

(87) PCT Pub. No.: WO2015/046773
PCT Pub. Date: Apr. 2, 2015

(65) Prior Publication Data
US 2016/0242150 A1   Aug. 18, 2016

(30) Foreign Application Priority Data

Sep. 26, 2013   (KR) .................. 10-2013-0114759
Jan. 21, 2014   (KR) .................. 10-2014-0007262

(51) Int. Cl.
*H04W 4/00*     (2009.01)
*H04W 72/04*   (2009.01)
*H04L 27/26*    (2006.01)

(52) U.S. Cl.
CPC ........... *H04W 72/042* (2013.01); *H04L 27/26* (2013.01)

(58) Field of Classification Search
None
See application file for complete search history.

(56) References Cited

U.S. PATENT DOCUMENTS

| 9,635,644 B2* | 4/2017 | Chen ............... H04W 72/04 |
| 2013/0163543 A1 | 6/2013 | Freda et al. |
| 2014/0105164 A1* | 4/2014 | Moulsley .......... H04W 72/042 370/329 |
| 2015/0131579 A1* | 5/2015 | Li ........................ H04L 1/08 370/329 |

(Continued)

OTHER PUBLICATIONS

Fujitsu, "Discussion on the impact of repetition on (E)PDCCH", R1-133131, 3GPP TSG RAN WG1 Meeting #74 Barcelona, Spain, Aug. 19-23, 2013.

(Continued)

*Primary Examiner* — Farah Faroul
(74) *Attorney, Agent, or Firm* — IP Legal Services, LLC

(57) ABSTRACT

A terminal receives downlink control information through downlink control channels repeatedly allocated by a plurality of subframes. To this end, the terminal receives configuration information related to the plurality of subframes through higher layer signaling. The terminal receives the downlink control channels repeatedly allocated by the plurality of subframes and combines the received downlink control channels based on the configuration information.

3 Claims, 16 Drawing Sheets

(56) References Cited

U.S. PATENT DOCUMENTS

| | | | |
|---|---|---|---|
| 2015/0181576 A1* | 6/2015 | Papasakellariou | H04L 5/0053 370/329 |
| 2015/0245340 A1* | 8/2015 | Cheng | H04W 48/12 370/331 |
| 2016/0014626 A1* | 1/2016 | Yi | H04J 11/0053 370/252 |
| 2016/0226649 A1* | 8/2016 | Papasakellariou | H04L 5/0057 |
| 2016/0330723 A1* | 11/2016 | Gao | H04B 7/26 |
| 2016/0338020 A1* | 11/2016 | Gao | H04L 1/0067 |
| 2016/0353420 A1* | 12/2016 | You | H04L 5/0053 |

OTHER PUBLICATIONS

Alcatel-Lucent et al., "Coverage enhancement for (E)PDCCH", R1-132973, 3GPP TSG-RAN WG1 Meeting #74 Barcelona, Spain, Aug. 19-23, 2013.

Huawei et al., "Coverage analysis on (E)PDCCH and PUCCH for low-cost MTC UEs", R1-130889, 3GPP TSG RAN WG1 Meeting #72b Chicago, USA, Apr. 15-19, 2013.

Zte, "Discussion on Repetition for Control Channel and Traffic Channel", R1-133062, 3GPP TSG RAN WG1 Meeting #74 Barcelona, Spain, Aug. 19-23, 2013.

\* cited by examiner

METHOD FOR TRANSRECEIVING DOWNLINK CONTROL INFORMATION AND APPARATUS FOR SAME

CROSS REFERENCE TO RELATED APPLICATIONS

This application is a National Stage Patent Application of PCT International Patent Application No. PCT/KR2014/008216 (filed on Sep. 2, 2014) under 35 U.S.C. § 371, which claims priority to Korean Patent Application Nos. 10-2013-0114759 (filed on Sep. 26, 2013) and 10-2014-0007262 (filed on Jan. 21, 2014), the teachings of which are incorporated herein in their entireties by reference.

TECHNICAL FIELD

The present disclosure relates to a method for transceiving downlink control information and apparatus therefor in wireless communication system and, more specifically, to a method and apparatus for repeatedly transceiving downlink control information for a terminal located in enhanced coverage as compared with coverage for a normal terminal.

BACKGROUND ART

Machine Type Communication (MTC) or Machine to Machine (M2M) is communication made between an apparatus and an object without human intervention or with minimum human intervention. The "machine" may mean an entity which does not require direct human operation or intervention. The "MTC" may mean a type of data communication including one or more such machines. For example, the "machine" may be a device with a mobile communication module mounted, such as a smart meter, a vending machine, or the like. Recently, a smart phone has been advanced to automatically access a network and perform communication without a user's operation or intervention. Accordingly, a portable terminal having an MTC function has been considered as one type of such a machine.

An MTC terminal may be installed in a place having a bad electric wave environment as compared with a normal terminal. Therefore, the coverage of the MTC terminal should be improved to about 20 dB or higher as compared with the coverage the normal terminal.

In order for the MTC terminal to operate in the coverage improved to about 20 dB or higher as compared with the normal terminal, control information and/or data of each physical channel transmitted in a unit of only one subframe may be required to be repeatedly transmitted in a plurality of subframes.

DETAILED DESCRIPTION OF THE INVENTION

Technical Problem

The purpose of the present disclosure is to provide a method and apparatus for providing, by a base station, configuration information to a terminal having expanded coverage so that the terminal can receive downlink control channels through a plurality of subframes and acquire scheduling information of downlink data channel and/or uplink data channel transmission resources.

TECHNICAL SOLUTION

An embodiment of the present disclosure provides a method for receiving, by a terminal, downlink control information (DCI) through downlink control channels (PDCCHs or EPDCCHs) repeatedly allocated in a plurality of subframes. The method may include: receiving configuration information relating to the plurality of subframes through higher layer signaling; receiving the downlink control channels repeatedly allocated to the plurality of subframes on the basis of the configuration information and combining the received downlink control channels; and extracting the downlink control information from the combined downlink control channels.

Another embodiment of the present disclosure provides a method for transmitting, by a base station, downlink control information through downlink control channels repeatedly allocated in a plurality of subframes. The method may include: transmitting configuration information relating to the plurality of subframes through higher layer signaling; and transmitting the downlink control information through the downlink control channels repeatedly allocated in the plurality of subframes.

Another embodiment of the present disclosure provides a terminal for receiving downlink control information through downlink control channels repeatedly allocated in a plurality of subframes. The terminal may include a reception unit configured to receive configuration information relating to the plurality of subframes through higher layer signaling, to receive the downlink control channels repeatedly allocated to the plurality of subframes, and to combine the received downlink control channels on the basis of the configuration information; and a controller configured to extract downlink control information from the combined downlink control channels.

Another embodiment of the present disclosure provides a base station for transmitting downlink control information through downlink control channels repeatedly allocated to a plurality of subframes. The base station may include: a transmission unit configured to transmit, through higher layer signaling, configuration information including at least one of information on a start subframe of the plurality of subframes, information on the number of the plurality of subframes, and information on the maximum number of the plurality of subframes and to transmit the downlink control information through the downlink control channel repeatedly allocated in the plurality of subframes.

Advantageous Effects

According to the present disclosure described above, a base station can provide configuration information to a terminal having expanded coverage so that the terminal can receive downlink control channels through a plurality of subframes and acquire scheduling information of downlink control channel and/or uplink data channel transmission resources.

BRIEF DESCRIPTION OF THE DRAWINGS

FIG. 1 illustrates an example of a wireless communication system to which an embodiment of the present disclosure is applied;

FIG. 2 illustrates an example of a method for performing, by a typical terminal, blind decoding on a PDCCH/EPDCCH to receive a PDSCH;

FIG. 3 illustrates an example of a method for performing, by a terminal having expanded coverage, blind decoding on a PDCCH/EPDCCH and receiving a PDSCH;

MODE FOR CARRYING OUT THE INVENTION

Figure 1:
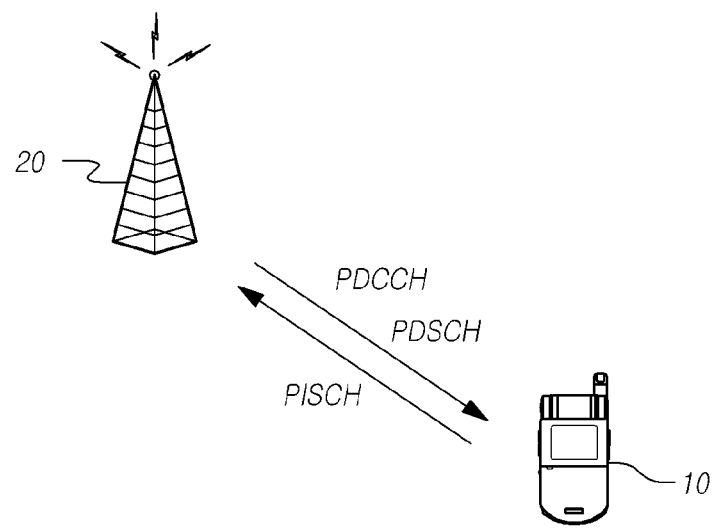

Hereinafter, some embodiments of the present disclosure will be specifically described through exemplary drawings. It should be noted that when assigning reference numerals to elements of each drawing, the same elements are intended to have the same reference numerals even when the same elements are shown on different drawings. Further, when describing the present disclosure, a detail description of well-known related configuration or function will be omitted when the detailed description is determined to obscure the subject matter of the present disclosure.

FIG. 1 illustrates an example of a wireless communication system to which an embodiment of the present disclosure is applied.

In accordance with at least one embodiment, the wireless communication system is widely disposed in order to provide various types of communication services, such as voice, packet data, and the like. The wireless communication system includes a User Equipment (UE) 10 and a Base Station (BS or eNB) 20. The concept of the User Equipment in the present disclosure is comprehensive and should be interpreted to include a Mobile Station (MS), a User Terminal (UT), a Subscriber Station (SS) a wireless device, etc. in a GSM in addition to a User Equipment (UE) in a wideband code division multiple access (WCDMA), long term evolution (LTE), high speed packet access (HSPA), etc.

The base station 20 or a cell generally refers to a station which communicates with the User Equipment. The base station 20 or the cell may be referred to as other terms, such as a Node-B, an evolved Node-B (eNB), a Sector, a Site, a Base Transceiver System, an Access Point, a Relay Node, a Remote Radio Head (RRH), a Radio Unit (RU), etc.

In other words, the Base Station or the cell in the present specification should be comprehensively interpreted to indicate some regions or functions which are covered by a Base Station Controller in CDMA, a Node-B in WCDMA, an eNB or sector (site) in LTE, etc., and is meant to encompass all of various coverage regions such as a mega cell, a macrocell, a microcell, a picocell, a femtocell, and a relay node, an RRH, an RU communication range, etc.

The User Equipment and the Base Station in the present specification are used, in a comprehensive meaning, to refer to two (Uplink and Downlink) transceiving subjects used to implement a technology or a technical idea described in the present specification, and are not limited by terms or words particularly referred thereto. Here, the uplink (UL) refers to a scheme for transceiving data to/from a Base Station by the User Equipment and a downlink (DL) refers to a scheme for transceiving data to/from the User Equipment by the Base Station.

There is no limit to a multiple access scheme applied to a wireless communication system. Various multiple access schemes, such as Code Division Multiple Access (CDMA), Time Division Multiple Access (TDMA), Frequency Division Multiple Access (FDMA), Orthogonal Frequency Division Multiple Access (OFDMA), OFDMA-FDMA, OFDM-TDMA, and OFDM-CDMA, may be available. An embodiment of the present disclosure may be applied to resource allocation in an asynchronous wireless communication field which has evolved into LTE and LTE-Advanced via GSM, WCDMA, an HSPA and a synchronous wireless communication field which has evolved into CDMA, CDMA-2000, and UMB. The present disclosure should not be interpreted as being restricted or limited to a particular wireless communication, and should be interpreted to include all the technical fields to which an idea of the present disclosure can be applied.

In uplink transmission and downlink transmission, a Time Division Duplex (TDD) scheme, which performs transmission by using different times, may be available or a Frequency Division Duplex (FDD) scheme, which performs transmission by using different frequencies, may be available.

Further, in a system such as LTE or LTE-Advanced, standards are configured by configuring an uplink and a downlink based on one carrier wave or carrier wave pair. An uplink and a downlink transmit control information through control channels, such as a Physical Downlink Control CHannel (PDCCH), a Enhanced PDCCH (EPDCCH), a Physical Control Format Indicator CHannel (PDFICH), a Physical Hybrid ARQ Indicator CHannel (PHICH), A Physical Uplink Control Channel (PUCCH), and the like, and include data channels, such as a Physical Downlink Shared Channel, a Physical Uplink Shared CHannel and the like, to transmit data.

The cell in the present specification may refer to a component carrier, which has the coverage of a signal transmitted from a transmission/reception point or the coverage of a signal transmitted from a transmission/reception point (transmission point), or the transmission/reception point itself.

The wireless communication system to which embodiments are applied may be a Coordinated Multi-point Transmission/Reception System (CoMP system), a Coordinated Multi-antenna Transmission System, or a Coordinated Multi-cell Communication System, in which two or more transmission/reception points coordinate with each other to transmit a signal. The CoMP system may include at least two multiple transmission/reception points and terminals.

The multiple transmission/reception points may be a base station or macro cell (hereinafter, referred to "eNB"), and at least one RRH which are connected to the eNB by an optical cable or an optical fiber to be wiredly controlled and which have high transmission power or have low transmission power within a macro cell area.

Hereinafter, the downlink refers to a communication or communication path from the multiple transmission/reception points to the terminals and the uplink refers to a communication or communication path from the terminals to the multiple transmission/reception points. In the downlink, a transmitter may be some of the multiple transmission/reception points and a receiver may be some of the terminals. In the uplink, a transmitter may be some the terminals and a receiver may be some of the multiple transmission/reception points.

Hereinafter, a situation in which a signal is transceived through channels such as the PUCCH, PUSCH, PDCCH, and PDSCH may also be expressed as "the PUCCH, PUSCH, PDCCH, and PDSCH are transmitted, or received."

The base station 20 performs downlink transmission by terminals 10. The base station 20 may transmit a Physical Downlink Shared CHannel (PDSCH) which is a main physical channel for unicast transmission; and a Physical Downlink Control CHannel (PDCCH) for transmitting downlink control information, such as a scheduling required for the reception of the PDSCH, and scheduling grant information for the transmission in a uplink data channel (e.g. a Physical Uplink Shared CHannel (PDSCH)). Hereinafter, a situation in which a signal is transceived through each channel will be described according to types of channel transmission/reception.

Referring to FIG. 1, the base station 20 transmits Downlink Control Information (DCI) to the terminal 10 through the PDCCH/EPDCCH. The DCI may include downlink scheduling assignment including PDSCH resource information or include uplink scheduling grant including the PUSCH resource information.

In other words, the base station 20 uses the DCI for allocating uplink/downlink data transmission resources to the terminal 10 and transmits the DCI to the terminal 10 by using a downlink control channel. The downlink control channel may be classified into a PDCCH and an EPDCCH according to the location of transmission resources used to transmit the DCI.

The PDCCH is transmitted from a control area which is set through a Control Format Indicator (CFI). The control area is formed over whole downlink bandwidth and includes one to four OFDM symbols according to a CFI setting value for each subframe.

The EPDCCH is transmitted by using residual transmission resources other than the control area within each subframe. The transmission resources used to transmit the EPDCCH may be used only for subframes and a plurality of Physical Resource Block (PRB) pairs, which are predefined as an higher layer signaling (e.g. a Radio Resource Control (RRC) for each terminal.

A basic unit of transmission resources in the transmission of the DCI through the PDCCH may be described as a Control Channel Element (CCE). One CCE may include nine Resource Element Groups (REGs) and one REG may include four Resource Elements (REs).

A basic unit of transmission resources in the transmission of the DCI through the EPDCCH may be described as an Enhanced CCE (ECCE). One ECCE may include four or eight Enhanced REGs (EREGs) according to the cyclic prefix length and/or TDD configuration, and one EREG may include a variable number of REs according to the RE used for Reference Signal (RS) transmission.

The base station 20 may set the number of CCEs used when transmitting one DCI through the PDCCH, according to a channel situation of the terminal. This is described as an aggregation level, and one, two, four, or eight CCEs may be used according the channel situation of the terminal.

Further, the base station 20 may set the number of ECCEs used when transmitting one DCI through the EPDCCH, according to a channel situation of the terminal. This is described as an aggregation level, and one, two, four, eight, 16, or 32 ECCEs may be used according the channel situation of the terminal.

As described above, the PDCCH/EPDCCH includes a plurality of CCEs/ECCEs, and the base station may transmit a plurality of DCIs to a plurality of terminals for each subframe. Here, the base station does not separately provide CCE/ECCE allocation information (i.e. CCE aggregation level information and CCE transmission resource location information) required for receiving, by the terminal, the DCI through the PDCCH/EPDCCH, the terminal performs blind decoding with respect to a possible aggregation level and the CCE transmission resources in order to identify the DCI transmitted to the terminal.

When considering a processing delay, it is actually impossible for the terminal to perform blind decoding on all CCE/ECCE combinations according to each aggregation level with respect to all CCEs/ECCEs existing within the PDCCH/EPDCCH. Therefore, the blind decoding is performed only with respect to a PDCCH candidate/EPDCCH candidate including CCE/ECCE indexes predefined according to each terminal. The CCE/ECCE indexes included in the PDCCH candidate/EPDCCH candidate according to each aggregation level may be defined as an aggregation level, a Radio Network Temporary Identifier (RNT) value, and a function of a slot number (or subframe number). The terminal may perform the blind decoding only with respect to a limited number of PDCCH candidates/EPDCCH candidates according to each aggregation level in each subframe.

Figure 2:
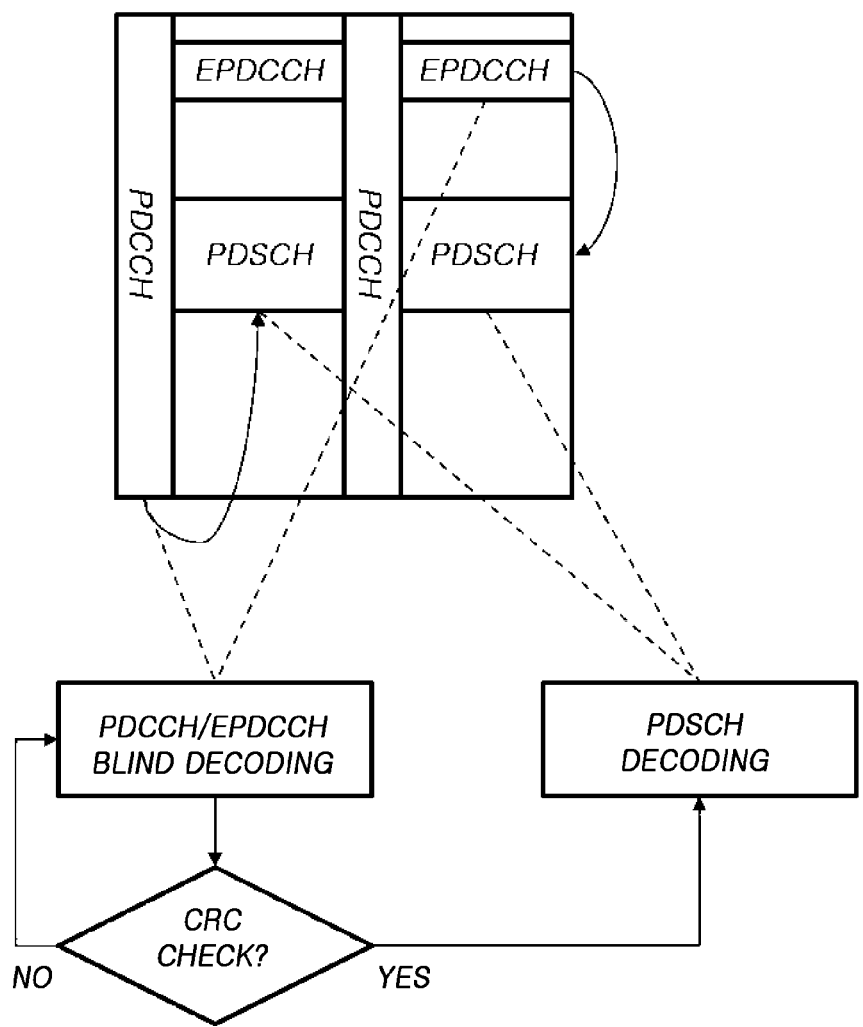

As an example, FIG. 2 illustrates a method for performing, by a typical terminal, blind decoding on a PDCCH/EPDCCH to receive the PDSCH. Referring to FIG. 2, the terminal performs PDCCH/EPDCCH blind decoding with respect to PDCCH candidates/EPDCCH candidates. A Cyclic Redundancy Check (CRC) is added to DCI, and the terminal checks the CRC to identify the DCI transmitted to the terminal. When the DCI transmitted to the terminal is identified as a result of the CRC check, the terminal acquires downlink scheduling information included the DCI and decodes a PDSCH by using a subframe in which the DCI has been transmitted and a downlink data transmission resource within the same subframe.

FIG. 2 exemplifies performing blind decoding on a PDCCH/EPDCCH and acquiring PDSCH scheduling information. In a scheme similar to that of FIG. 2, the PUSCH scheduling information may also be acquired by performing blinding decoding on the PDCCH/EPDCCH.

[MTC]

Machine Type Communication (MTC) is defined as communication made between an apparatus and an object without human invention. In view of the 3GPP, the "machine" means an entity which does not require direct human operation or intervention and the "MTC" is defined as one type of data communication including one or more such machines. A smart meter, a vending machine, and the like, in which a mobile communication module is mounted, have been described as typical examples of the machine. Recently, a smart phone has been advanced to automatically access a network to perform communication without a user's operation or intervention. Accordingly, such a portable terminal having a MTC function has been considered to be one type of the machine.

[Low-Cost MTC Based on LTE]

As an LTE network spreads, a mobile communication provider desires to minimize the number of a Radio Access Terminals (RATs) in order to reduce maintenance costs. However, products based on a typical GSM/GPRS network are increasing and MTC using a low data transmission rate may be provided at a low cost. Therefore, since the mobile communication provider uses an LTE network in order to transmit general data and uses a GSM/GPRS network for MTC, the mobile communication provider should separately operate two RATs. This problem causes inefficient use of a frequency band and becomes a burden on the profits of the mobile communication provider.

In order to solve this problem, a low-cost terminal using a GSM/EGPRS network should be replaced by a MTC terminal using an LTE network. To this end, various requirements for lowering the price of an LTE MTC terminal are being discussed in 3GPP RAN WG1 standardization meetings. Further, in the standardization meetings, documents (for example, 3GPP TR 36.888) which describe various functions providable for satisfying the requirements are being written.

Examples of the main standardization items, which are under discussion in the 3GPP in order to support the low-cost LTE MTC terminal, related to a change in physical layer standards, include techniques such as narrow band support/single RF chain/half duplex FDD/Long Discontinued Reception (Long DRX). However, the techniques may reduce the performance of the MTC terminal, as compared with a conventional LTE terminal.

Further, about 20% of MTC terminals supporting a MTC service such as a smart metering are installed in a 'deep indoor' environment such as a basement. Therefore, in order to successfully transmit MTC data, the coverage of the LTE MTC terminal should be improved by about 20 dB, as compared with the coverage of a typical LTE terminal. In addition, when additionally considering the reduction of performance due to the change in the standards, the coverage of the LTE MTC terminal should be improved by about 20 dB or higher.

As described above, in order to improve the coverage of the LTE MTC while reducing the price thereof, various methods for robust transmission, such as PSD boosting, low coding rate, and time-domain reception, are considered according to each physical channel.

The requirements for the LTE-based low-cost MTC terminal are as follows:

Data transmission speed should satisfy at least data speeds which are provided by an EGPRS-based MTC terminal, i.e. downlink 118.4 kbps and uplink 59.2 kbps.

Frequency efficiency should be innovatively improved as compared with a GSM/EGPRS MTC terminal.

A provided service area should not be smaller than a service area provided by the GSM/EGPRS MTC terminal.

The amount of power consumed should not be larger than that consumed by the GSM/EGPRS MTC terminal.

A legacy LTE terminal and an LTE MTC should be able to be used in the same frequency.

A existing LTE/SAE network is reused.

Optimization is performed in a TDD mode in addition to an FDD mode.

The low-cost LTE MTC terminal should support a module having limited mobility and low power consumption.

In order for a terminal having expanded coverage, such as an MTC terminal, to operates in coverage which has been improved by about 20 dB, as compared with a typical LTE terminal, it is possible to consider repeatedly transmitting, to a plurality of subframes, each physical channel's data, which has been repeatedly transmitted only in a unit of one subframe up to now. A terminal receiving the data may perform soft combining with regard to the same transmission data in view of the number of the repeated subframes, and then decode the transmitted data.

Further, in DCI transmission, even when up to eight CCEs or up to 32 ECCEs are used, a terminal having coverage expanded by about 20 dB may not succeed in blind decoding. Therefore, it is possible to consider repeatedly transmitting, to a plurality of subframes, DCI which has been repeatedly transmitted only in a unit of one subframe up to now. A terminal receiving the DCI may perform soft combining with regard to the same DCI in view of the number of the repeated subframes, and then decode the transmitted DCI.

Figure 3:
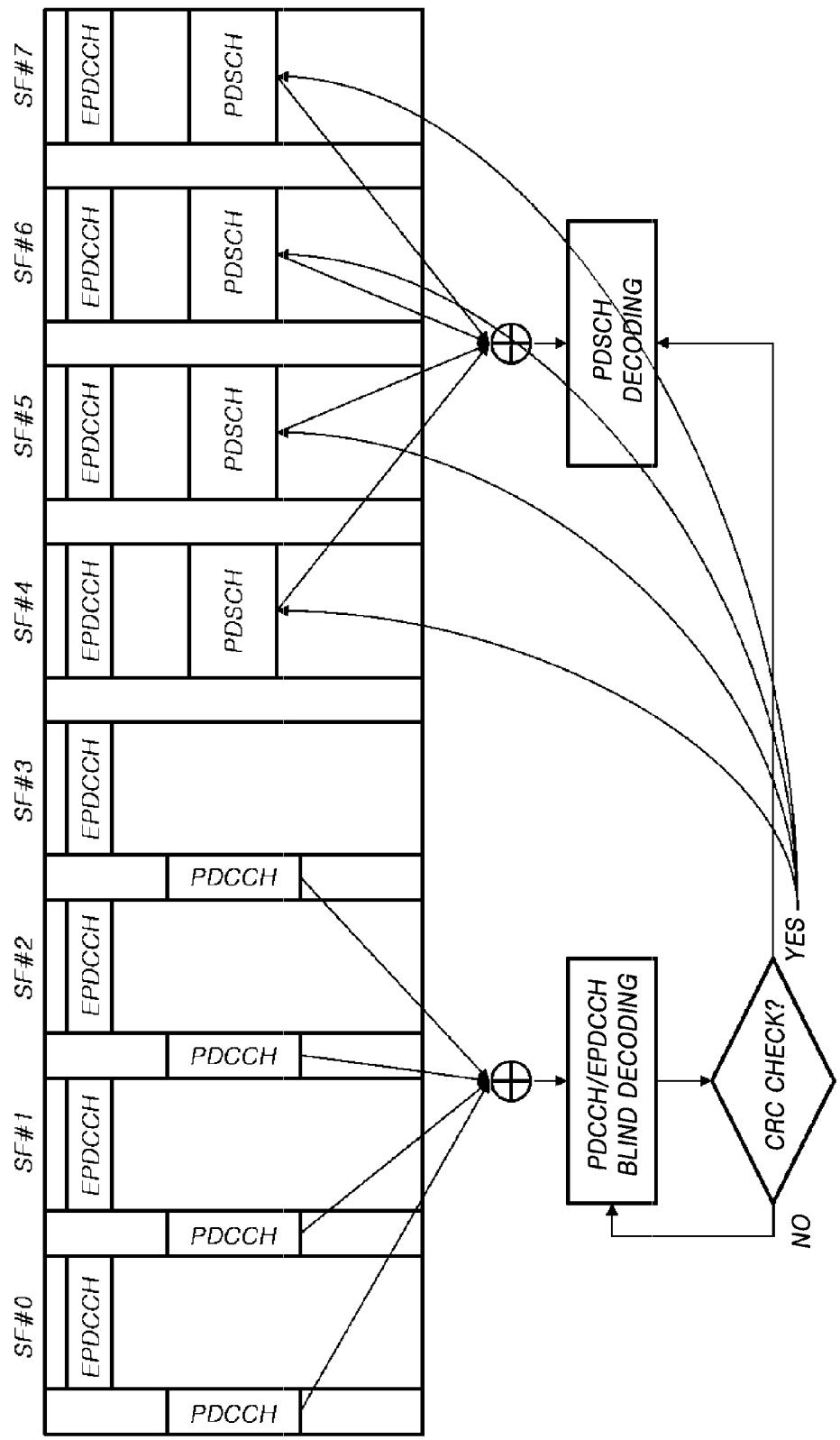

FIG. 3 illustrates an example of a method for performing, by a terminal having expanded coverage, blind decoding on a PDCCH/EPDCCH and receiving a PDSCH.

In the example of FIG. 3, a base station repeatedly transmits one DCI through four subframes of Subframe Number #0 (SF#0) to SF#3 in view of a channel situation of a terminal. Further, the base station repeatedly transmits the same data through four subframes of SF#3 to SF#6 in view of a channel situation of a terminal. When the terminal performs soft combining on and blinding decoding on all of reception values of the DCI transmitted through SF#0 to SF#3 to succeed in a CRC check, the terminal identifies PDSCH scheduling information included in the DCI. The terminal performs soft combining on all values of the data received through SF#3 to SF#6 and performs blind decoding on the same.

In the example of FIG. 3, it can be shown that transmission resources of a PDSCH through which data is transmitted are allocated beginning from the last subframe among a plurality of subframes where a PDCCH, through which DCI is transmitted, is allocated. However, the present disclosure is not limited thereto, and the relationships between a plurality of subframes through which DCI is repeatedly transmitted and a plurality of subframes through which data is repeatedly transmitted may be different. As an example, transmission resources of the PDSCH through which data is transmitted may be allocated beginning from a subframe next to the last subframe among a plurality of subframes where a PDCCH, through which DCI is transmitted, is allocated. As another example, a plurality of subframes through which DCI is repeatedly transmitted may be the same as a plurality of subframes through which data is repeatedly transmitted.

FIG. 3 illustrates an example of performing blind decoding on PDCCH/EPDCCH and acquiring PDSCH scheduling information. In a scheme similar to FIG. 3, the PUSCH scheduling information may also be acquired by performing blind decoding on the PDCCH/EPDCCH.

Meanwhile, a terminal may not know information on the number of subframes in which a PDCCH is repeated in order to transmit one DCI and/or the first subframe. Here, the terminal attempts to perform soft combining on all cases of the number of subframes in which a PDCCH is repeated in order to transmit one DCI and/or the first subframe. In this case, a problem as described below may occur.

For example, the terminal may know a start subframe of a plurality of subframes where a PDCCH is repeatedly transmitted but may not know the number of a plurality of subframes where a PDCCH is repeatedly transmitted.

Figure 4:
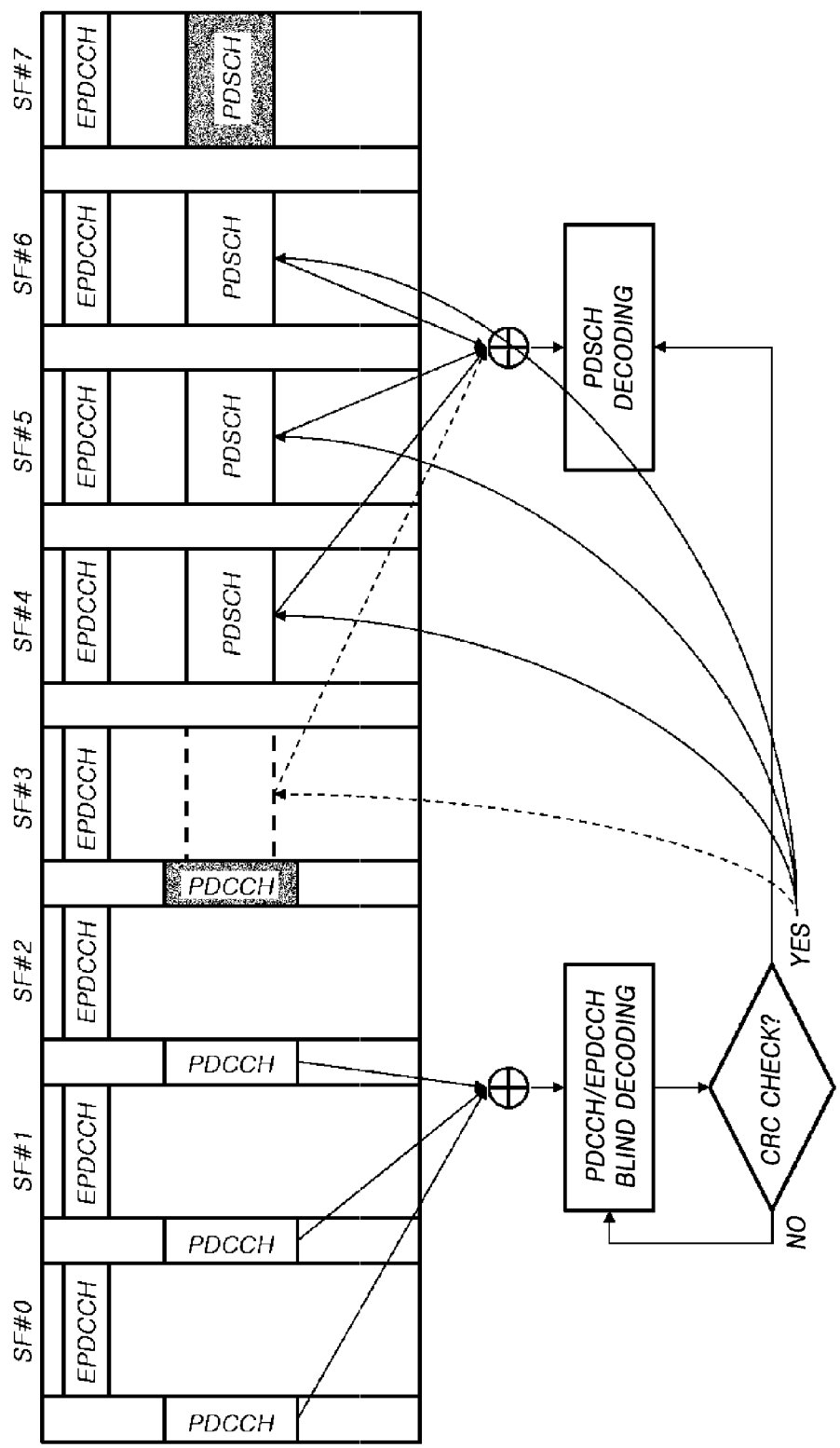
FIG. 4 illustrates an example of a case in which a terminal does not know the number of subframes having a repeated PDCCH in the example of FIG. 3.

As an example, FIG. 4 illustrates an example of a case in which a terminal does not know the number of subframes having a repeated PDCCH in FIG. 3.

In FIG. 4, the terminal knows that a PDCCH is transmitted beginning from SF#0. However, the terminal cannot know how many subframes have the same information repeatedly transmitted therein, and thus perform soft combining of a DCI reception value with a previous DCI reception value every subframe beginning from SF#0 and performs blind decoding on the DCI reception value, until the blind decoding is successful.

Here, a base station repeatedly transmitted a PDCCH with regard to four subframes of SF#0 to SF#3 and repeatedly transmitted a PDSCH with regard to four subframes of SF#3 to SF#6. When a terminal channel situation is changed and the terminal succeeds in soft combining a reception value of DCI transmitted through a PDCCH in three subframes of SF#0 to SF#2 and performing blind decoding on the same, the terminal may determine that the PDCCH has been transmitted with regard to the three subframes of SF#0 to SF#2 and may assume that PDSCH transmission resources have been allocated beginning from SF#2. In this case, actual PDSCH transmission resources are allocated beginning from SF#3 but the terminal will attempt to perform soft combining and blinding decoding on data beginning from SF#2.

Meanwhile, the terminal may know the number of a plurality of subframes where a PDCCH is repeatedly transmitted but may not know a start subframe of the plurality of subframes where the PDCCH is repeatedly transmitted. In this case, the terminal should store, in a buffer, each of DCI reception values transmitted in the three previous subframes of every subframe.

Meanwhile, the terminal may not know both the number of a plurality of subframes where a PDCCH is repeatedly transmitted and a start subframe of the plurality of subframes where the PDCCH is repeatedly transmitted. In this case, the terminal may randomly set the size of a buffer so as to store DCI reception values transmitted to N subframes. Further, the terminal performs, sequentially; soft combining and blind decoding on DCI reception values transmitted to N-1 previous subframes beginning from a DCI reception value transmitted to a current subframe every subframe. In this case, the number of times the blind decoding is performed may increase by up to N times as compared with the conventional art. If the value of N is set to be small, the blind decoding may fail to be performed and if the value of N is set to be large, the processing time of the terminal increases.

Therefore, when a downlink control channel is repeatedly allocated in a plurality of subframes, the base station may be required to transfer, to the terminal, i) information on a start subframe of the plurality of subframes and/or ii) information on the number of the plurality of subframes. Hereinafter, description will be made on embodiments in which the base station transfers, to the terminal, the information on a start subframe of the plurality of subframes and/or the information on the number of the plurality of subframes.

Embodiment 1

Figure 5:
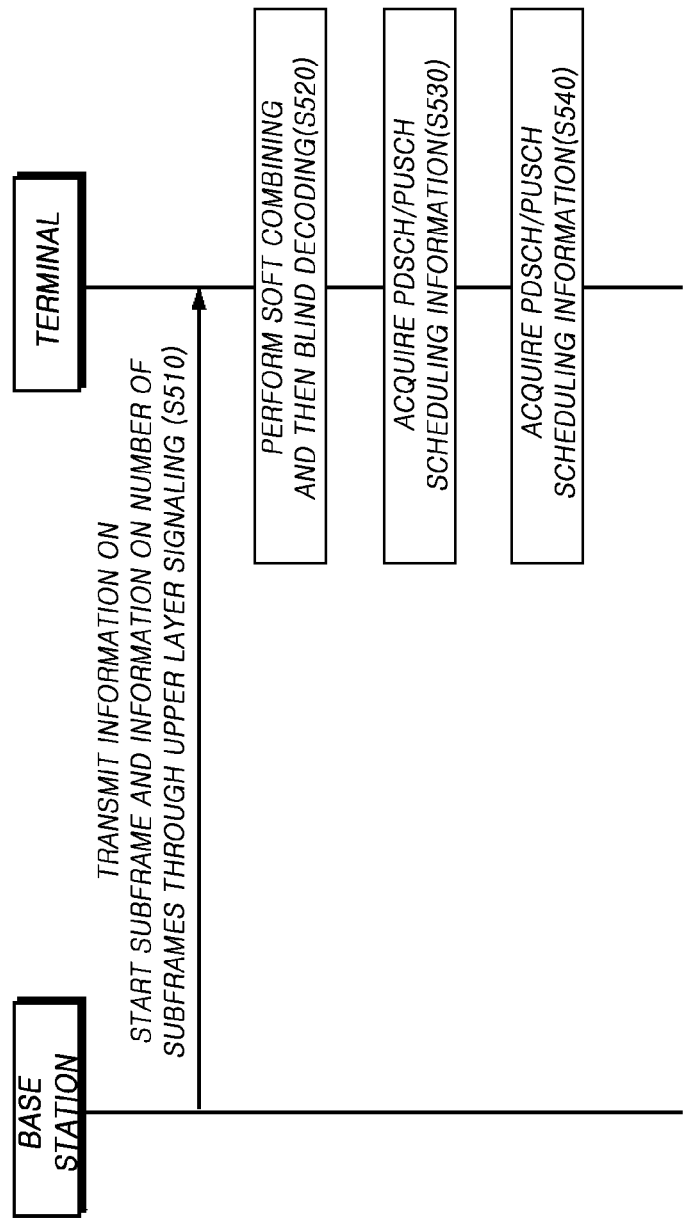
FIG. 5 illustrates a method for transceiving DCI according to a first embodiment.

FIG. 5 illustrates a method for transceiving DCI according to a first embodiment.

Referring to FIG. 5, a base station transfers i) information on a start subframe of the plurality of subframes, in which DCI is repeatedly transmitted, to the terminal through an higher layer signaling and ii) information on the number of the plurality of subframes (step S510). The information on the start subframe may include a value of a particular subframe index (or subframe number) indicating a start point and a value of a cycle on which the start subframe cyclically is repeated.

For example, when a start subframe has a cycle of N frames (1 frame=10 subframes), information of the start subframe may indicate the value of N indicating a frame cycle, and one of 10*N subframe indexes or a plurality of subframe indexes. For example, the information indicating the subframe index may be a bitmap including 10*N bits. For example, if N=2, the base station may transfer a bitmap including a sequence of N=2 and 20 bits to the terminal through higher layer signaling. When the base station transfers, in the bitmap, bit indexes 1 and 13 as "1" and transfers the remaining bit indexes as "0", the terminal may consider, on a cycle of two frames, SF#1 of the first frame and SF#3 of the second frame to be a start subframe in which DCI is transmitted. When a transmission cycle of the start subframe is a predetermined value (for example, one frame), the cycle value may be omitted.

In the case of an EPDCCH, subframe configuration information of an 'EPDCCH-Config information element', transmitted through higher layer signaling for EPDCCH transmission, may be considered to be information on a start subframe of the EPDCCH.

The terminal performs soft combining on a DCI reception value in a subframe, determined based on information on a start subframe of a plurality of subframes and information on the number of the plurality of subframes, and then performs blind decoding on the value (step S520). In this case, the number of times the terminal performs the blind decoding may be the same as the previous number of times.

When the terminal succeeds in the blind decoding, the terminal acquires scheduling information, which is included in DCI, of PDSCH transmission resources and PUSCH transmission resources (step S530), and the terminal receives a PDSCH or transmits a PUSCH, on the basis of the acquired scheduling information (step S540).

Figure 6:
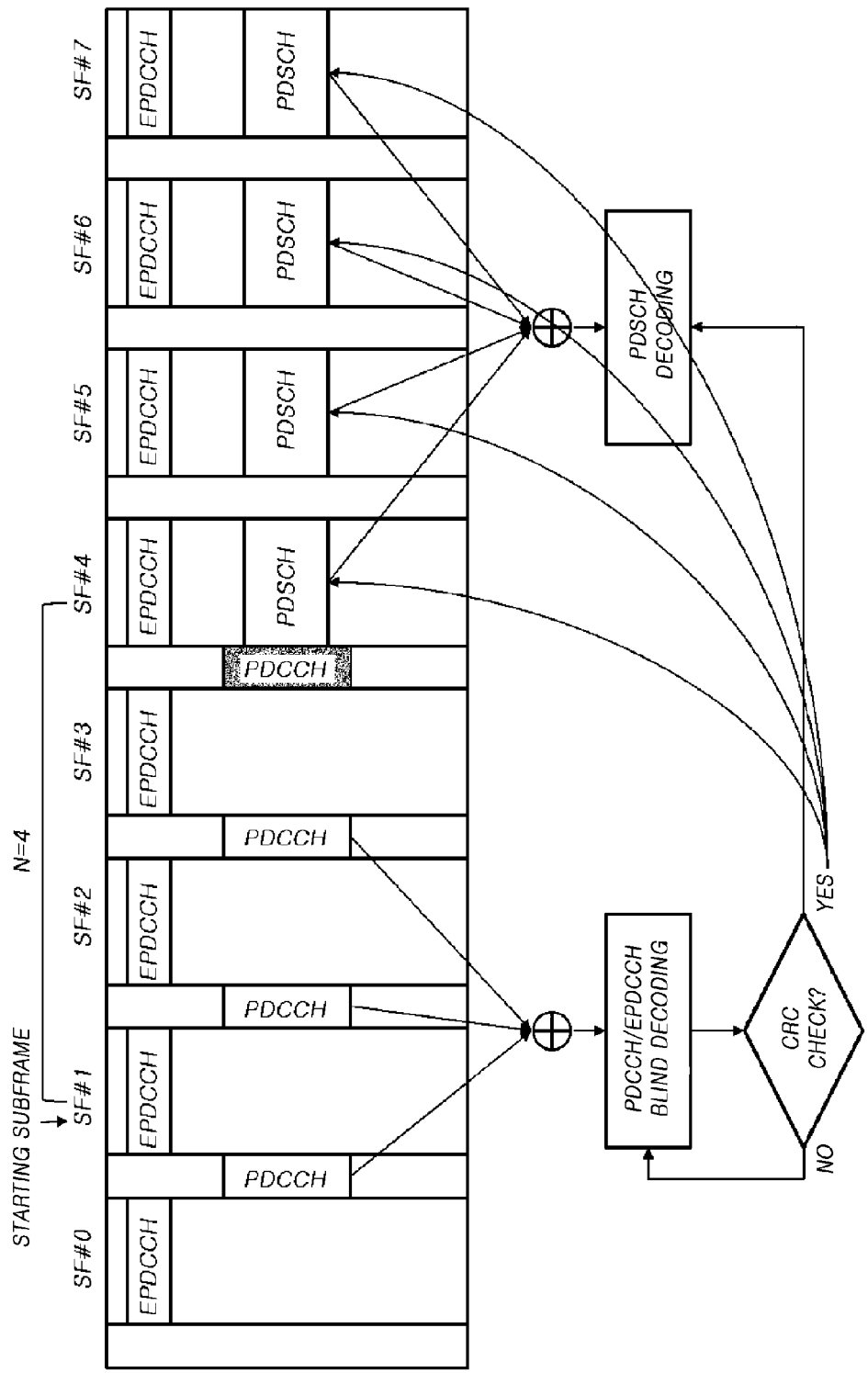
FIG. 6 illustrates an example of receiving a PDCCH and a PDSCH according to FIG. 5.

FIG. 6 illustrates an example of receiving a PDCCH and a PDSCH according to the present embodiment.

In the example of FIG. 6, when a terminal receives configuration information in which SF#1 is set to be a start subframe and the number (N) of subframes is four, the terminal performs soft combining on a DCI reception value in SF#1 to SF#4 and then performs blind decoding on the value. If the blind decoding is successful, the terminal acquires downlink scheduling information from DCI, performs soft combining on data in one or more subframes beginning from SF#4, and then performs blind decoding on the data. The transmission of a PUSCH by a terminal on the basis of uplink scheduling information may also be performed in a scheme similar to FIG. 6.

Here, even when the terminal performs soft combining on DCI transmitted through PDCCHs in three subframes of SF#1 to SF#3 and succeeds in blind decoding on the DCI, the terminal knows that the DCI will be transmitted up to SF#4 on the basis of the number of subframes in which the DCI is repeatedly transmitted, and thus the terminal will not attempt to perform soft combining on the data until the repeated DCI transmission has been completed.

In FIG. 6 as described above, a transmission resource (e.g., subframe) of a PDSCH/PUSCH is determined by a subframe in which a PDCCH is transmitted and the subframe in which the PDCCH is transmitted is fixed by higher layer signaling, and thus a problem in that the transmission resource is scheduled only in the fixed subframe may occur. This hinders efficient use of the resource. For example, in FIG. 6, PDSCH reception is scheduled through subframes continuing from SF#4.

In order to solve this problem, the scheduling information acquired in step 530 may include information on a start subframe to which the PDSCH/PUSCH is allocated and/or information on the number of subframes in which the PDSCH/PUSCH is repeatedly transmitted. Therefore, the transmission resource (e.g., subframe) of the PDSCH/PUSCH may be dynamically set. The information of the start subframe may include information of an index of the start subframe in which the PDSCH/PUSCH is transmitted, information on a difference between an index of a subframe (e.g. the last subframe among a plurality of subframes in which the PDCCH is transmitted) in which a PDCCH is transmitted and an index of the start subframe in which the PDSCH/PUSCH is transmitted, or the like.

Figure 7:
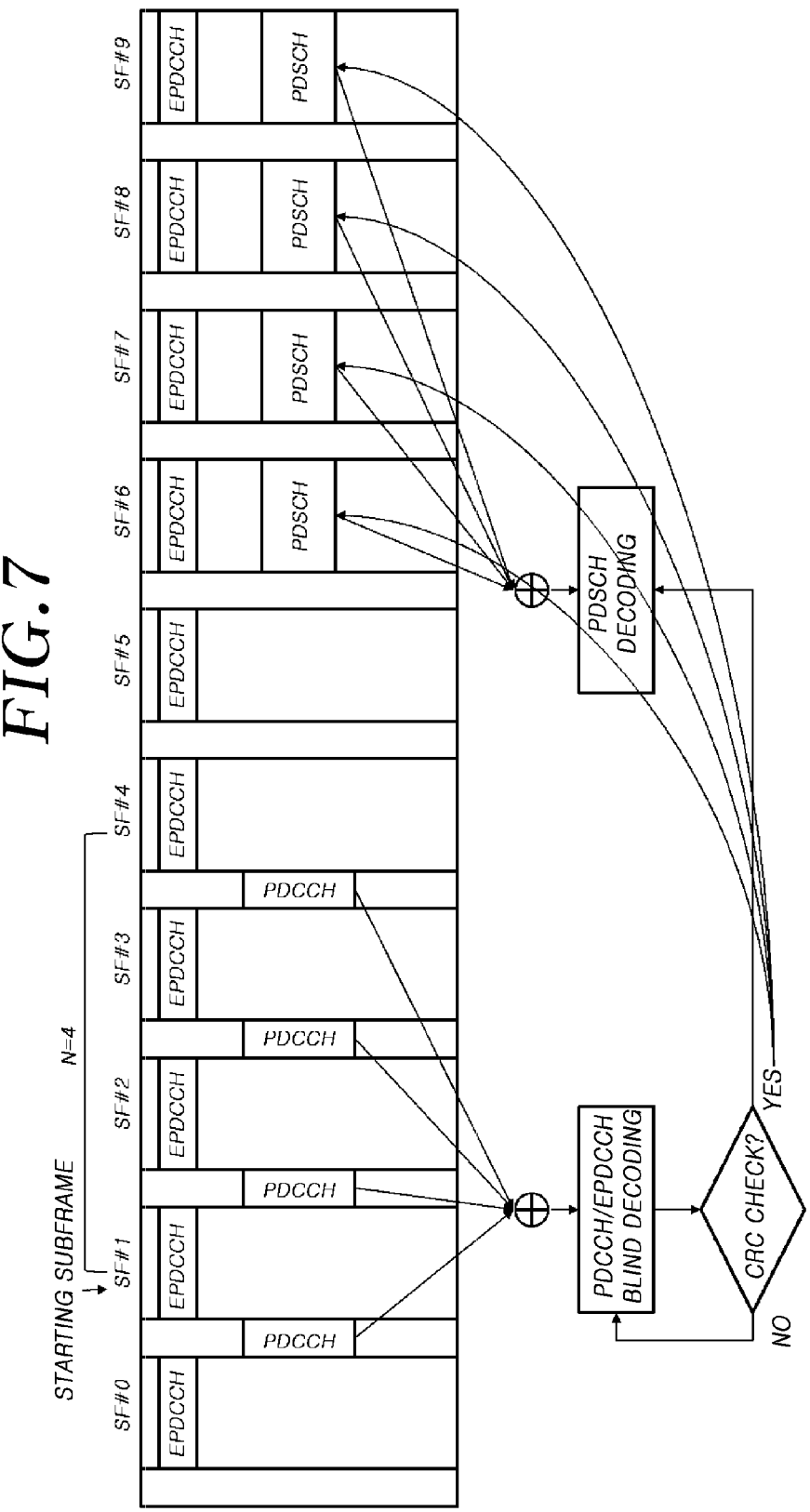
FIG. 7 illustrates another example of receiving a PDCCH and a PDSCH according to FIG. 5.

FIG. 7 illustrates another example of receiving a PDCCH and a PDSCH according to the present embodiment.

In the example of FIG. 7, when SF#1 is set to be a start subframe and the number of subframes is four, a terminal performs, in SF#1 to SF#4, soft combining on a DCI reception value and then performs blind decoding on the value. When the blind decoding is successful, the terminal acquires downlink scheduling information from DCI. The downlink scheduling information acquired from the DCI may include information on a start subframe of and/or the number of subframes where PDSCH/PUSCH transmission is allocated. When the downlink scheduling information indicates the start subframe of subframes, in which the PDSCH transmission is allocated, to be SF#6 and indicates the number of subframes, to which the PDSCH transmission is allocated, to be four, the terminal performs soft combining and then decoding on data in SF#6 to SF#9.

Embodiment 2

Figure 8:
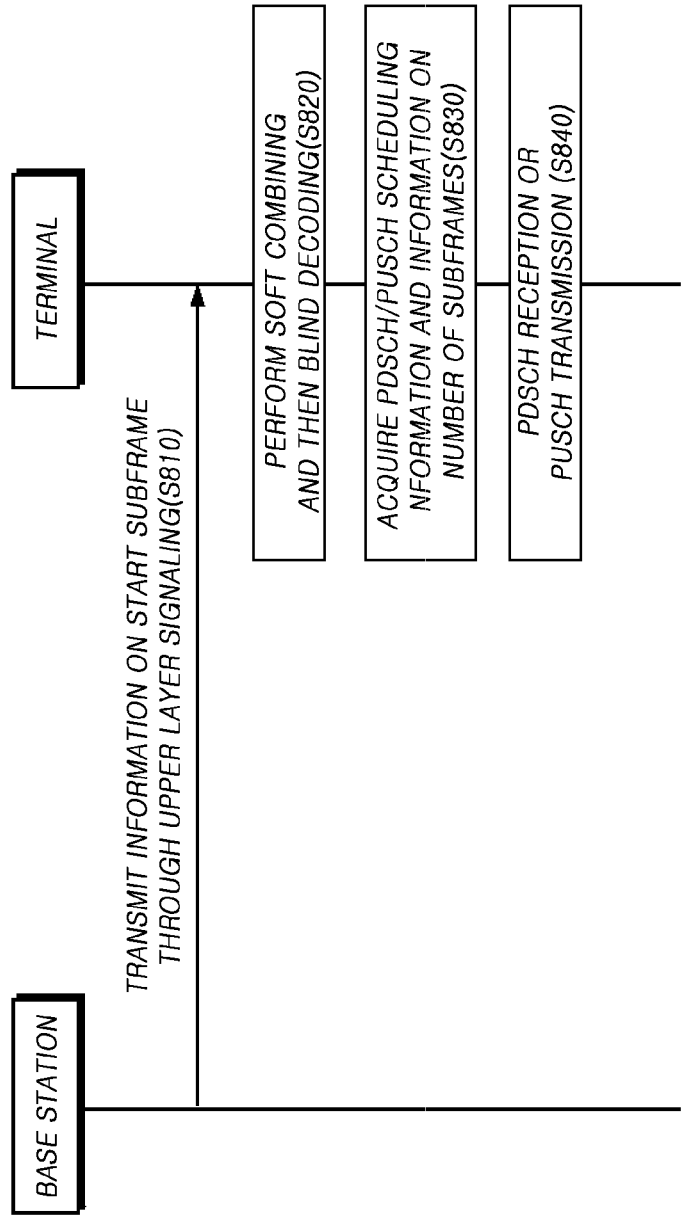
FIG. 8 illustrates a method for transceiving DCI according to a second embodiment.

FIG. 8 illustrates a method for transceiving DCI according to a second embodiment.

Referring to FIG. 8, a base station transmits information on a start subframe of a plurality of subframes where DCI is repeatedly transmitted to a terminal through higher layer signaling (step S810). The information on the start subframe may include a value of a particular subframe index (or subframe number) indicating a start point and a value of a cycle on which the start subframe cyclically is repeated.

For example, when a start subframe has a cycle of N frames (1 frame=10 subframes), information of the start subframe may indicate the value of N indicating a frame cycle, and one of 10*N subframe indexes or a plurality of subframe indexes. For example, the information indicating the subframe index may be a bitmap including 10*N bits. For example, if N=2, the base station may transfer a bitmap including a sequence of N=2 and 20 bits to the terminal through higher layer signaling. When the base station transfers, in the bitmap, bit indexes 1 and 13 as "1" and transfers the remaining bit indexes as "0", the terminal may consider, on a cycle of two frames, SF#1 of the first frame and SF#3 of the second frame to be a start subframe in which DCI is transmitted. When a transmission cycle of the start subframe is a predetermined value (for example, one frame), the cycle value may be omitted.

In the case of an EPDCCH, subframe configuration information of an 'EPDCCH-Config information', transmitted through higher layer signaling for EPDCCH transmission, may be considered to be information on a start subframe of the EPDCCH.

The terminal performs soft combining on a DCI reception value on the basis of the information on the start subframe of the plurality of subframes and then performs blind decoding on the value (step S820). Since the terminal does not know the number of the plurality of subframes, the terminal performs soft combining, until the blind decoding is successful, beginning from the start subframe.

When the terminal succeeds in the blind decoding, the terminal acquires scheduling information, which is included in DCI, of PDSCH transmission resources and PUSCH transmission resources (step S830).

Here, the DCI includes the information on the number of the plurality of subframes where the DCI is repeatedly transmitted. The terminal can know subframes where the DCI is repeatedly transmitted, on the basis of the information, which is received through higher layer signaling, on the start subframe of a plurality of subframes where the DCI is repeatedly transmitted and the information, which is included in the DCI, on the number of a plurality of subframes where the DCI is repeatedly transmitted. Therefore, the terminal can predict transmission subframes of the PDSCH/PUSCH.

The terminal receives the PDSCH or transmits the PUSCH, on the basis of the acquired scheduling information (step S840).

Figure 9:
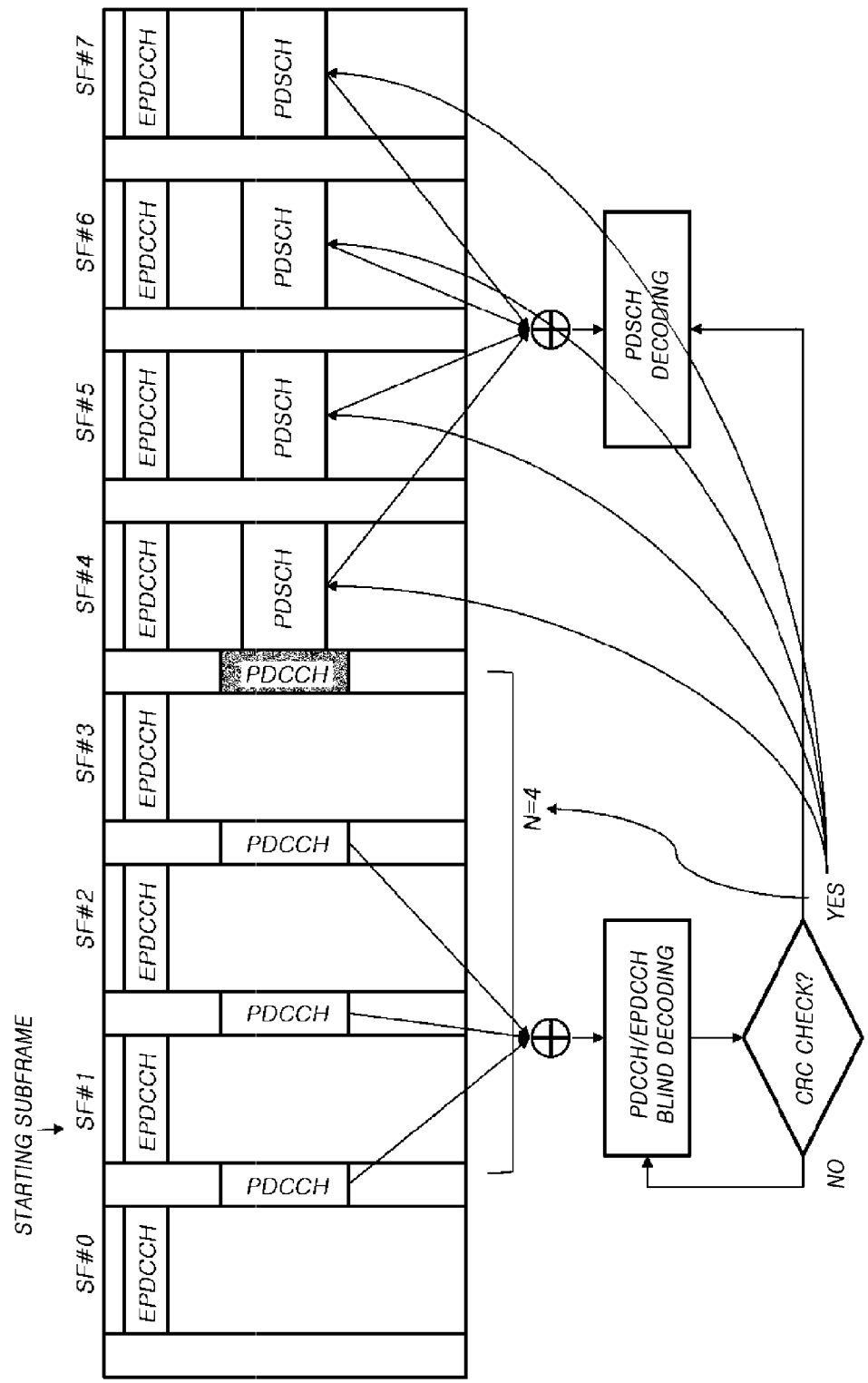
FIG. 9 illustrates an example of receiving a PDCCH and a PDSCH according to FIG. 8.

FIG. 9 illustrates an example of receiving a PDCCH and a PDSCH according to the present embodiment.

In the example of FIG. 9, when the terminal receives configuration information, in which SF#1 is set as a start subframe, through higher layer signaling, the terminal performs soft combining and then blind decoding on a DCI value in subframes continuing from SF#1. If the blind decoding is successful, the terminal extracts, from DCI, information on the number of subframes where the DCI is repeatedly transmitted, and predicts subframes where the PDSCH is transmitted.

In this case, the DCI is repeatedly transmitted through four subframes of SF#1 to SF#4, but even when the terminal performs soft combining on DCI transmitted through a PDCCH in three subframe of SF#1 to SF#3 and succeeds in blind decoding on the DCI, the terminal can know that the DCI will be transmitted up to SF#4, on the basis of information, which is included in the DCI, on the number of subframes where the DCI is repeatedly transmitted, and thus the terminal will not receive data through the PDSCH or transmit data through the PUSCH, before the repeated DCI transmission is completed.

Embodiment 3

Figure 10:
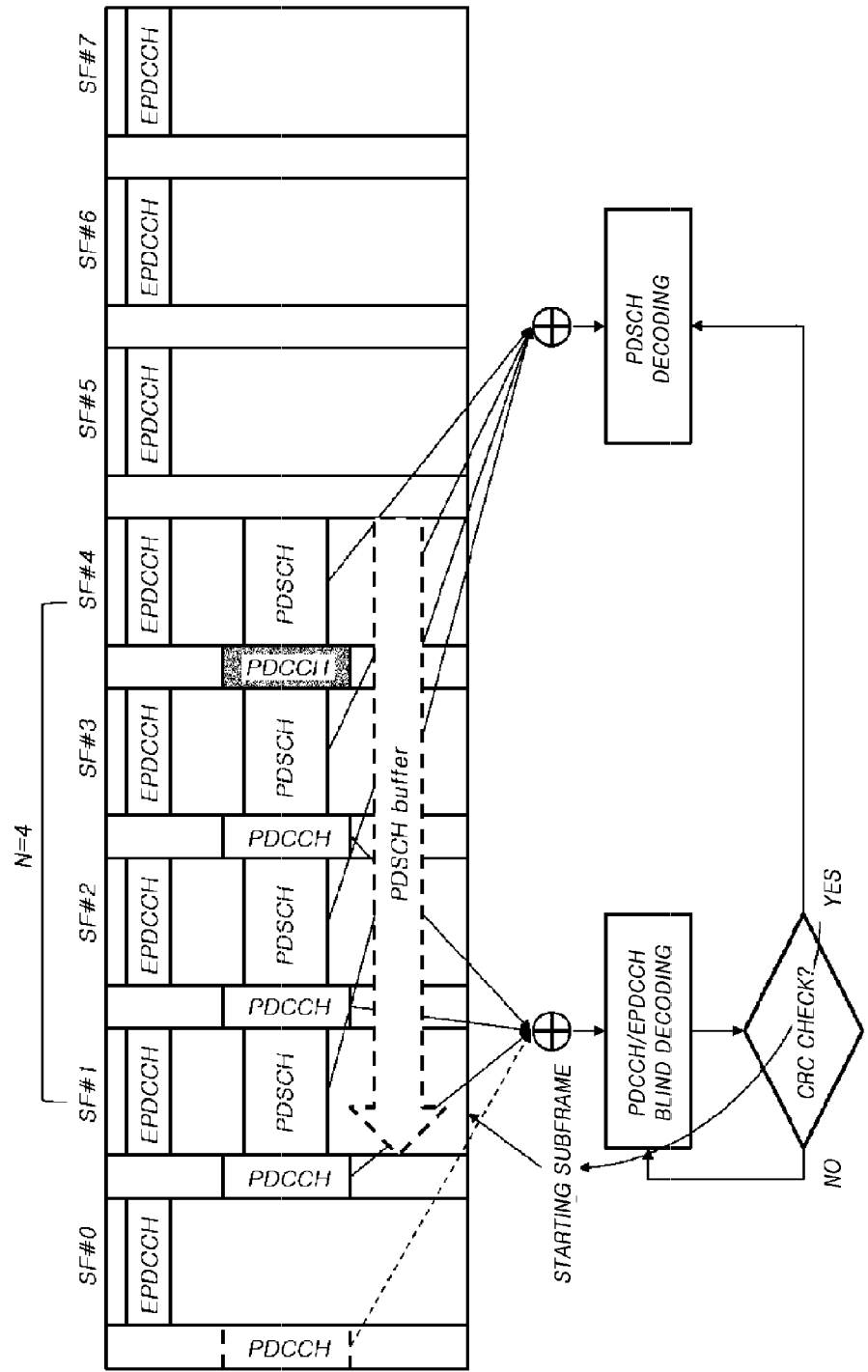
FIG. 10 illustrates an example of a method for performing, by a terminal having expanded coverage, blind decoding on a PDCCH and receiving a PDSCH when PDCCH/EPDCCH and PDSCH are repeated in the same subframes.

FIG. 10 illustrates an example of a method for performing, by a terminal having expanded coverage, blind decoding on a PDCCH and receiving a PDSCH when PDCCH/EPDCCH and PDSCH are repeated in the same subframes.

Referring to FIG. 10, a base station repeatedly transmits one DCI to four subframes of SF#1 to SF#4 in view of a terminal channel environment. When the terminal performs soft combining and blind decoding on all transmission values of DCI information transmitted in SF#1 to SF#4 and, as a result, succeeds in a CRC check, the terminal identifies PDSCH scheduling information included in the DCI and then performs decoding on PDSCH reception values.

In the example of FIG. 10, a PDSCH transmission resource is allocated beginning from the first subframe where the PDCCH is transmitted.

In the example of FIG. 10, since PDSCH allocation information cannot be determined until the terminal succeeds in blind decoding on a PDCCH, the terminal needs a PDSCH buffer which can store PDSCH reception values transmitted from SF#1 corresponding to a PDCCH transmission start subframe to SF#4 up to a time when the blind decoding is successful.

In FIG. 10, the terminal can know, through higher layer signaling, that the PDCCH is transmitted to four subframes with respect to one DCI. However, since the terminal cannot know which frame the DCI transmission begins from, the terminal always performs soft combining and blind decoding on DCI reception values with respect to four consecutive subframes.

It is assumed that the base station has repeatedly transmitted a PDCCH with respect to four subframes from SF#1 to SF#4 and has also repeatedly transmitted a PDSCH with respect to the four subframes from SF#1 to SF#4. Here, when the terminal performs soft combining on a DCI reception value and with respect to four subframes from SF#0 to SF#3 and succeeds in blind decoding on the value, the terminal may determined that a PDSCH has also been repeatedly transmitted to the four subframes from SF#0 to SF#3.

In order to solve this problem, the terminal may be required to know information on a start subframe of a plurality of subframes where DCI is repeatedly transmitted.

In the present embodiment, when the terminal acquires scheduling information of a PDSCH transmission resource, the base station may transfer information on the number of repeated subframes to the terminal through higher layer signaling and may include information on a start subframe of the repeated subframes in DCI and transfer the information on the start subframe. When the terminal performs soft combining and successful blind decoding on a DCI reception value with respect to the four subframes from SF#0 to SF#3 and the start subframe is determined to be SF#1 on the basis of the DCI, the terminal can know that a PDCCH transmission resource and a PDSCH transmission resource have been allocated to four subframes from SF#1 to SF#4.

FIG. 10 illustrates an example in which a PDCCH and a PDSCH are repeatedly transmitted in the same subframe but the present embodiment may also be applied wherever there is a relationship between a subframe where the PDCCH is repeatedly transmitted and a subframe where the PDSCH is repeatedly transmitted. In other words, in the case of determining a subframe where the PDSCH is repeatedly transmitted based on a subframe where the PDCCH is repeatedly transmitted, if the subframe where the PDCCH is repeatedly transmitted is erroneously determined, the subframe where the PDSCH is repeatedly transmitted may be also erroneously determined. For example, when it is set that a PDSCH is to be repeatedly transmitted following a subframe where a PDCCH is repeatedly transmitted, the PDCCH is transmitted from SF#1 to SF#4 and the PDSCH is transmitted from SF#5 to SF#8. However, when the terminal determines that the PDCCH has been transmitted from SF#0 to SF#3, the terminal may erroneously determine that the PDSCH is transmitted from SF#4 to SF#7. In this case, the start subframe information included in DCI may prevent a PDSCH transmission resource from being erroneously determined.

Figure 11:
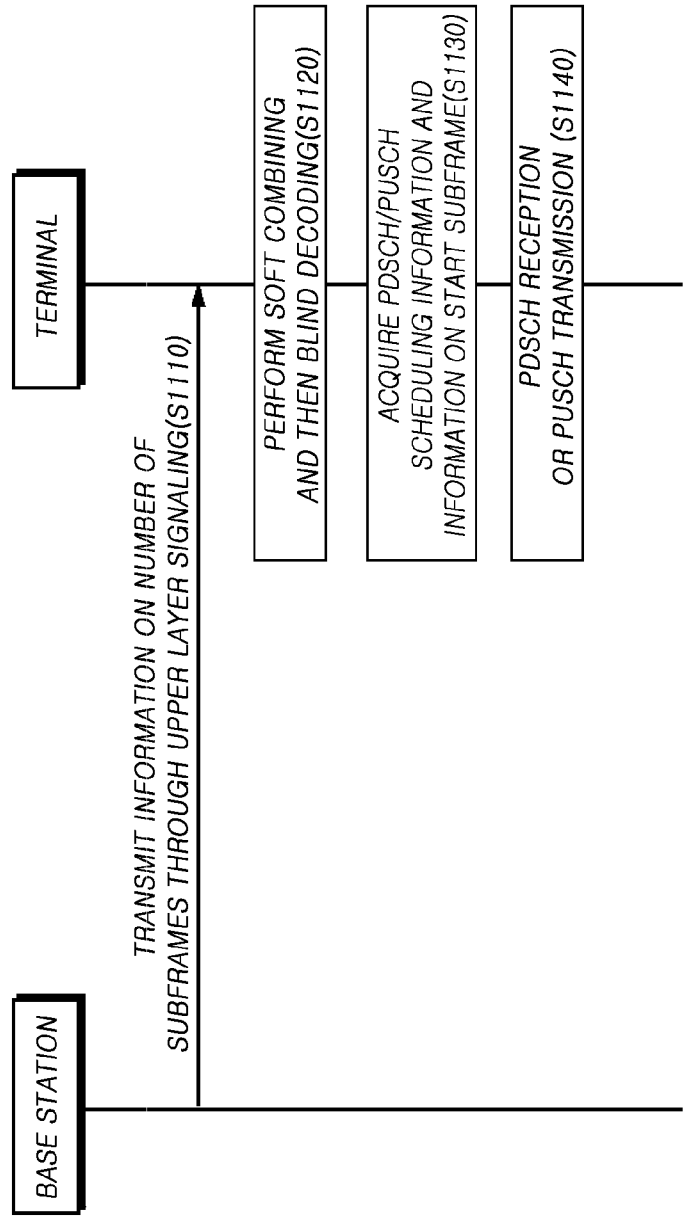
FIG. 11 illustrates a method for transceiving DCI according to a third embodiment.

FIG. 11 illustrates a method for transceiving DCI according to the third embodiment.

Referring to FIG. 11, the base station transmits information on the number of a plurality of subframes, in which DCI is repeatedly transmitted, to a terminal through higher layer signaling (step S1110).

The terminal performs soft combining and then blind decoding on DCI reception values in the plurality of subframes on the basis of the information on the plurality of subframes (step S1120). When the number of the plurality of subframes is N and an index of a current subframe is k, the terminal performs soft combining and then blind decoding on DCI reception values in subframe indexes k-N+1 to k.

When the terminal succeeds in the blind decoding, the terminal extracts information included in DCI (step S1130). The DCI may include scheduling information of a PDSCH transmission resource and PUSCH transmission resource.

Further, the DCI may include the information on a start subframe of a plurality of subframes where the DCI is repeatedly transmitted. The terminal may know a subframe where the DCI is repeatedly transmitted, on the basis of the information, which is received through higher layer signaling, on the number of a plurality of subframes in which the DCI is repeatedly transmitted and the information, which is included in the DCI, on a start subframe of a plurality of subframes where the DCI is repeatedly transmitted, and therefore may predict a transmission subframe of PDSCH/PUSCH.

The terminal receives the PDSCH or transmits the PUSCH, based on the acquired scheduling information (step S1140).

Figure 12:
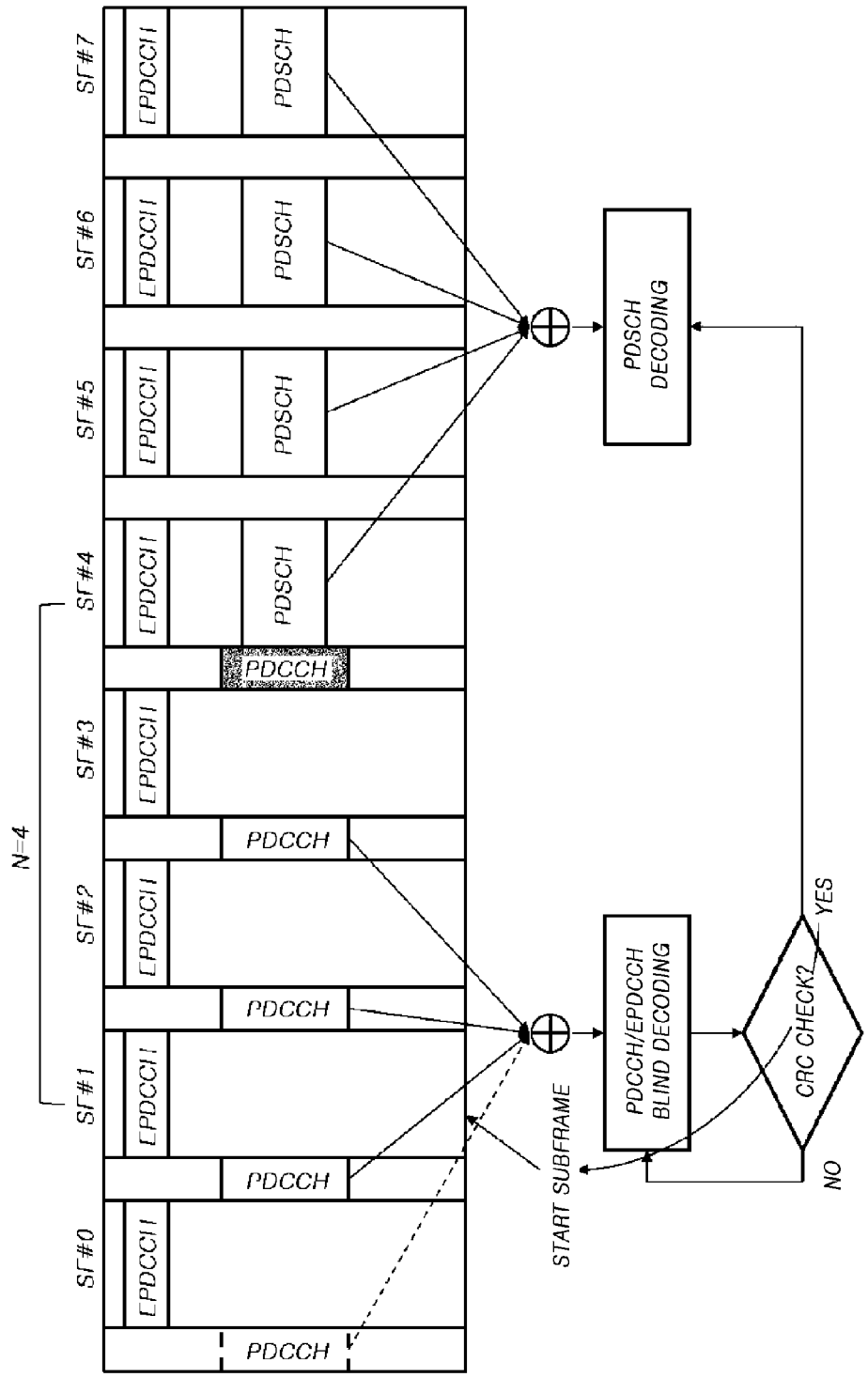
FIG. 12 illustrates an example of receiving a PDCCH and a PDSCH according to FIG. 11.

FIG. 12 illustrates an example of receiving a PDCCH and a PDSCH according to an embodiment.

In the example of FIG. 12, when a terminal receives, through higher layer signaling, configuration information in which DCI is set to be repeatedly transmitted to four subframes, the terminal performs soft combining and then blind decoding on DCI values in four consecutive subframes including a current subframe. When the blind decoding is successful, the terminal extracts, from the DCI, information on a start subframe of subframes where the DCI is repeatedly transmitted and predicts a subframe where a PDSCH is transmitted.

In this case, the DCI is repeatedly transmitted through four subframes of SF#1 to SF#4, but even when the terminal performs soft combining on DCI transmitted through a PDCCH in four subframes of SF#0 to SF#3 and succeeds in blind decoding on the DCI, the terminal can know that the DCI is transmitted from SF#1 to SF#4, on the basis of information, which is included in the DCI, on the number of subframes where the DCI is repeatedly transmitted, and thus the terminal may know a subframe where the PDSCH is transmitted.

Embodiment 4

Figure 13:
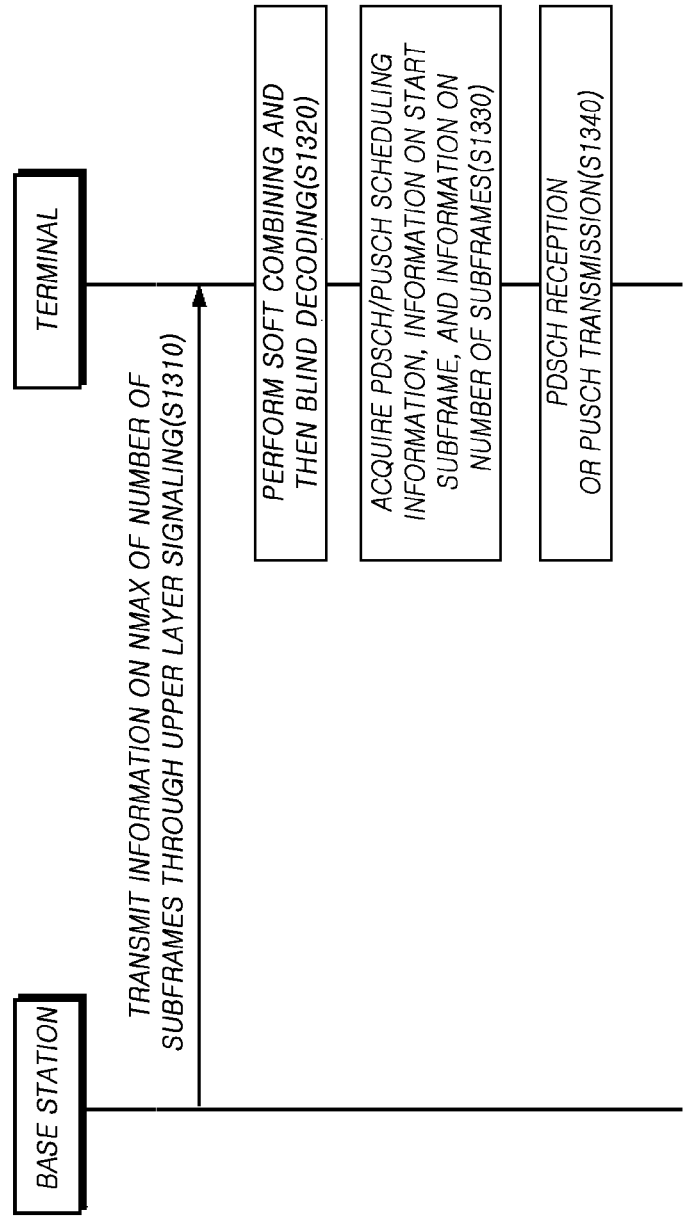
FIG. 13 illustrates a method for transceiving DCI according to a forth embodiment.

FIG. 13 illustrates a method for transceiving DCI according to a fourth embodiment.

Referring to FIG. 13, a base station transmits, to a terminal through higher layer signaling, the maximum value (Nmax) of the number of one or more subframes where DCI is repeatedly transmitted (step S1310).

The terminal performs soft combining and then blind decoding on DCI reception values in a plurality of subframes (step S1320). Here, the terminal performs soft combining on DCI reception values in one or more consecutive subframes including a current subframe and the number of the one or more consecutive subframes is limited by the maximum value (Nmax). The terminal sequentially increases the number of subframes, on which the soft combining is performed, up to a time when the blind decoding is successful beginning from one subframe. This process continues up to a time when the number of subframes which perform soft combining becomes the maximum value (Nmax).

When the terminal succeeds in the blind decoding, the terminal extracts information included in the DCI (step S1130). The DCI may include scheduling information on a PDSCH transmission resource and a PUSCH transmission resource.

Further, the DCI may include information on a start subframe of a plurality of subframes where the DCI is repeatedly transmitted and information of the number of the plurality of subframes where the DCI is repeatedly transmitted. The terminal does not acquire information of a subframe in which PDSCH/PUSCH is scheduled on the basis of a subframe on which the soft combining has been performed when succeeding in the blind decoding. However, the terminal may know a subframe in which the DCI is repeatedly transmitted, on the basis of the information, which is included in the DCI, on the start subframe of the plurality of subframes where the DCI is repeatedly transmitted and the information of the number of the plurality of subframes where the DCI is repeatedly transmitted. Therefore, the terminal may predict a transmission subframe of the PDSCH/PUSCH.

The terminal receives a PDSCH or transmits a PUSCH, based on the acquired scheduling information (step 1340).

Figure 14:
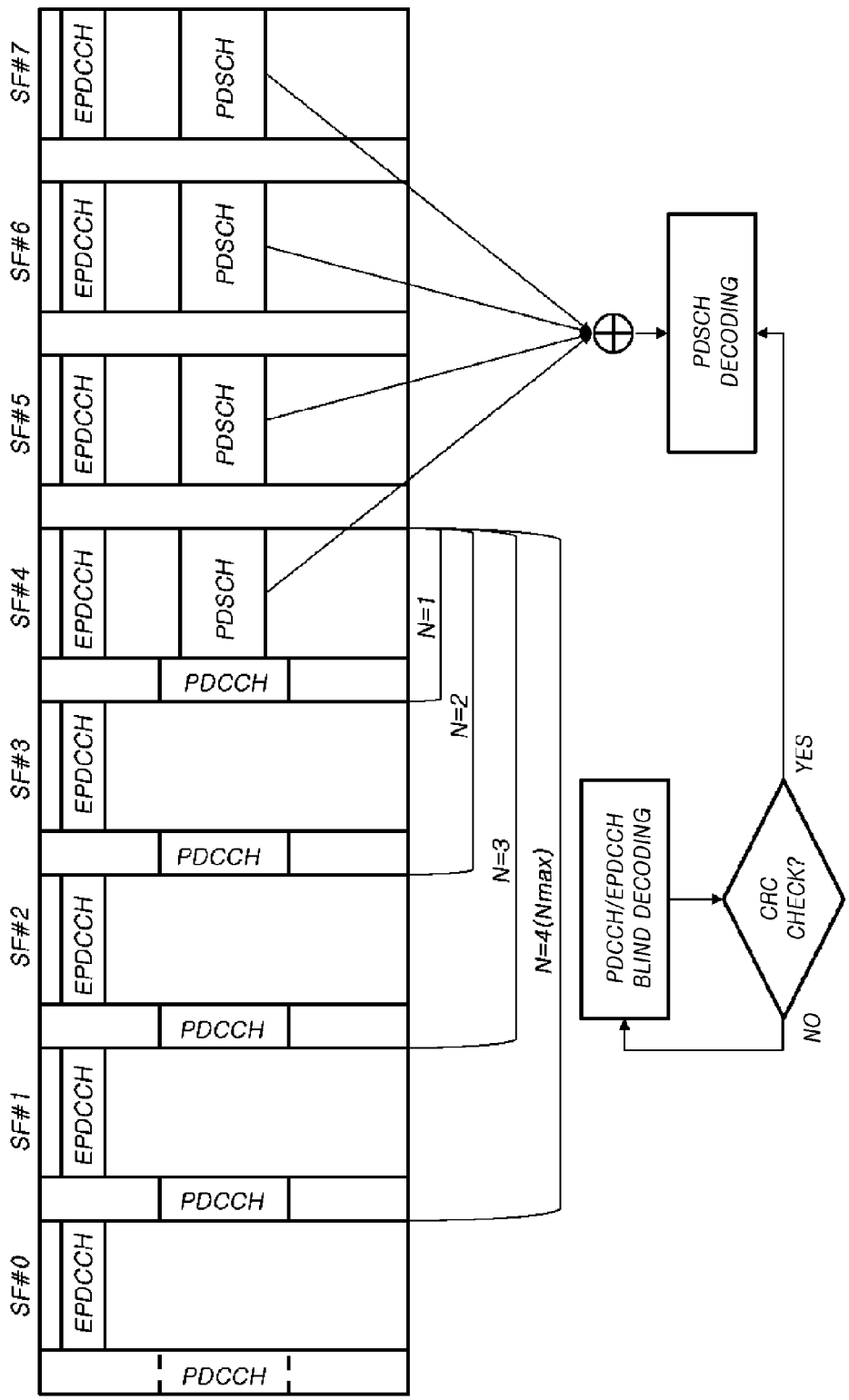
FIG. 14 illustrates an example of receiving a PDCCH and a PDSCH according to FIG. 13.

FIG. 14 illustrates an example of receiving a PDCCH and a PDSCH according to an embodiment.

In the example of FIG. 14, a terminal receives configuration information, in which Nmax is 4, through higher layer signaling. The terminal performs soft combining and then blind decoding on DCI values in one or more consecutive subframes including a current subframe. Here, the number of consecutive subframes on which the soft combining is performed may be 4 (e.g., Nmax). When the blind decoding is successful, the terminal extracts, from DCI, information on a start subframe of subframes where the DCI is repeatedly transmitted and information on the number of subframes where the DCI is repeatedly transmitted, and predicts a subframe in which a PDSCH is transmitted, based on the extracted information.

In this case, the DCI is repeatedly transmitted through four subframes of SF#1 to SF#4. However, even when the terminal performs soft combining on DCI transmitted through a PDCCH in three subframe of SF#2 to SF#4 and succeeds in blind decoding on the DCI, since the terminal can know that the DCI will be transmitted from SF#1 to SF#4, on the basis of the information, which is included in the DCI, on a start subframe of subframes where the DCI is repeatedly transmitted and the information on the number of subframes where the DCI is repeatedly transmitted, the terminal may know the subframe where the PDSCH is transmitted. The above-described embodiments have been described by mainly exemplifying a PDCCH but the present disclosure is not limited thereto and may be applied even when an EPDCCH is repeatedly transmitted in a plurality of subframes. Further, the above-described embodiments have been described by mainly exemplifying scheduling information for receiving the PDCCH by a terminal, but the present disclosure is not limited thereto and may be applied even in the case of scheduling information for receiving a PUSCH by the terminal.

Some embodiments of the present disclosure may be limited to one of PDSCH scheduling and PUSCH scheduling. For example, Embodiment 1, 2, or 4 may be used to repeatedly transmit DCI required for PUSCH resource allocation and Embodiment 3 or 4 may be used to repeatedly transmit DCI required for PDSCH resource allocation.

Figure 15:
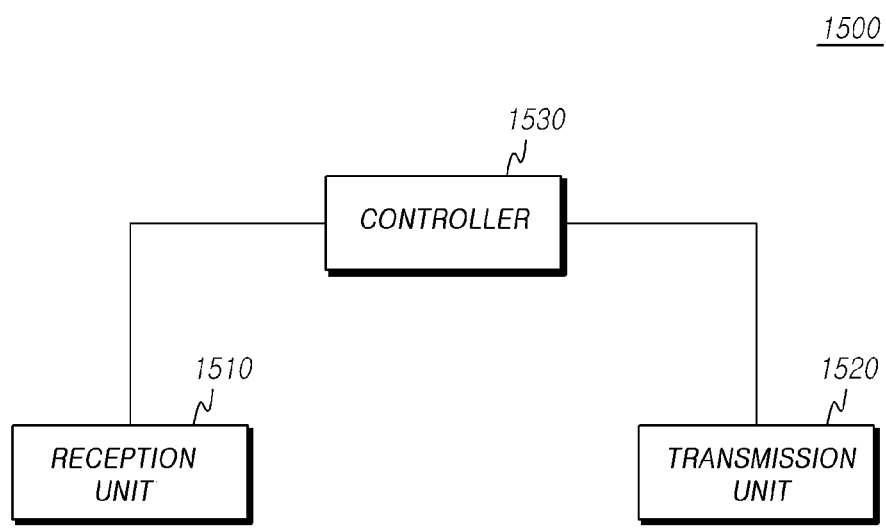
FIG. 15 illustrates a configuration of a terminal according to an embodiment of the present disclosure.

FIG. 15 illustrates a configuration of a terminal according to an embodiment of the present disclosure.

Referring to FIG. 15, a terminal 1500 includes a reception unit 1510, a transmission unit 1520, and a controller 1530. The terminal 1500, which is a terminal (for example, MTC terminal) having expanded coverage, may receive downlink control information through a downlink control channel repeatedly allocated in a plurality of subframes.

The reception unit 1510 may receive configuration information through higher layer signaling. The configuration information may include at least one among, for example, i) information on a start subframe of a plurality of subframes, ii) information on the number of a plurality of subframes, and iii) information on the maximum number of a plurality of subframes, but is not limited thereto and may not include all the information.

The reception unit 1510 may combine and receive a downlink control channel repeatedly allocated in a plurality of subframes, based on the configuration information.

The controller 1530 may extract downlink control information from the received downlink control channel. When the downlink control information is downlink scheduling information, the controller 1530 may control the reception unit 1510 to receive downlink data, based on the downlink scheduling information. When the downlink control information is the uplink scheduling information, the controller 1530 may control the transmission unit 1520 to transmit uplink data, based on the uplink scheduling information.

When the configuration information includes i) information on a start subframe of a plurality of subframes and ii) information on the number of the plurality of subframes, the reception unit 1510 may determine a plurality of subframes where the downlink control channel is repeatedly allocated, based on the information on the start subframe and the information on the number of subframes. The reception unit 1510 may receive a downlink control channel through the plurality of determined subframes. Information on subframes to which an uplink data channel or a downlink data channel is allocated may be determined based on the information on the start subframe and the information on the number of subframes, which are included in the configuration information (Embodiment 1).

When the configuration information includes information on a start subframe of a plurality of subframes, the reception unit 1510 may receive a downlink control channel through a plurality of subframes continuing from the start subframe, based on the information on the start subframe. Here, downlink control information may include information of the number of the plurality of subframes. The information on subframes to which an uplink data channel or a downlink data channel is allocated may be determined based on i) the information on the start subframe, which are included in the configuration information, and ii) information on the number of subframes, which is the downlink control information (Embodiment 2).

When the configuration information includes information on the number (N) of a plurality of subframes, the reception unit 1510 may receive a downlink control channel through N consecutive subframes up to a current subframe, based on the information on the number (N) of subframes. Here, downlink control information may include information on a start subframe of a plurality of subframes. Information on subframes to which an uplink data channel or a downlink data channel is allocated may be determined based on i) the information on the number of subframes, which is included in the configuration information, and ii) the information on the start subframe, which is included in the downlink control information (Embodiment 3).

When the configuration information includes information on the maximum value (Nmax) of the number of a plurality of subframes, the reception unit 1510 may receive a downlink control channel through one or more consecutive subframes up to a current subframe, wherein the reception unit 1510 may receive the downlink control channel while increasing the number of the consecutive subframes from 1 to Nmax. Here, the downlink control information may include information on a start subframe of the plurality of subframes and information on the number of the plurality of subframes. Information on subframes to which the uplink data channel or the downlink data channel is allocated may be determined based on the information on the start subframe, which is included in the downlink control information, and the information on the number of subframes (Embodiment 4)

Figure 16:
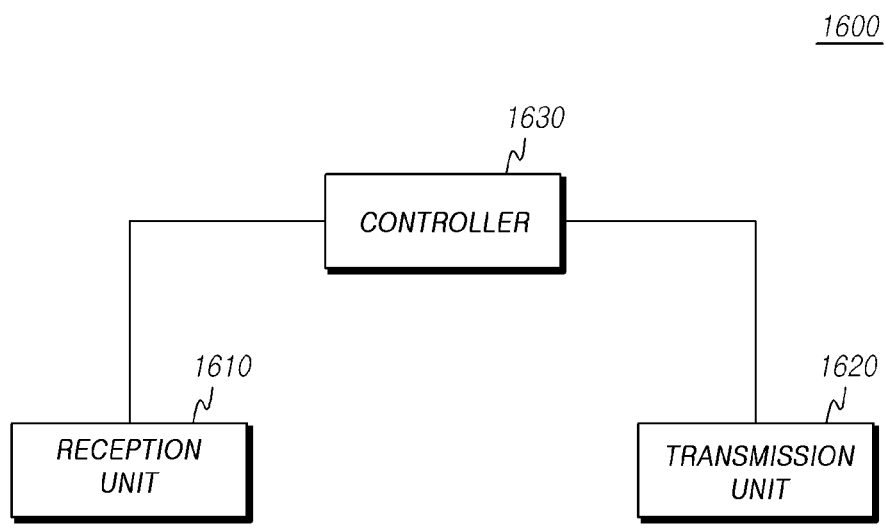
FIG. 16 illustrates a configuration of a base station according to an embodiment of the present disclosure.

FIG. 16 illustrates a configuration of a base station according to an embodiment of the present disclosure.

Referring to FIG. 16, a base station 1600 includes a reception unit 1610, a transmission unit 1620, and a controller 1630. The base station 1600 may transmit downlink control information to a terminal (for example, MTC terminal) having expanded coverage, through a downlink control channel repeatedly allocated in a plurality of subframes.

The transmission unit 1620 may transmit configuration information through higher layer signaling. The configuration information may include at least one among, for example, i) information on a start subframe of the plurality of subframes, ii) information on the number of the plurality of subframes, and ii) information on the maximum number of the plurality of subframes. However, embodiments of the present disclosure are not limited thereto. For example, the configuration information may not include all the information.

The transmission unit 1620 may repeatedly transmit a downlink control channel in the plurality of subframes.

When the downlink control information transmitted through the downlink control channel is downlink scheduling information, the controller 1630 may control the transmission unit 1620 to transmit downlink data according to the downlink scheduling information. When the downlink control information is uplink scheduling information, the controller 1630 may control the reception unit 1610 to receive uplink data according to the uplink scheduling information.

The configuration information may include i) information on a start subframe of a plurality of subframes and ii) information on the number of a plurality of subframes. In a terminal which has received the downlink control information, information on subframes to which the uplink data channel or the downlink data channel is allocated may be determined based on the information on the start subframe and information on the number of subframes, which are included in the configuration information (Embodiment 1).

The configuration information may include information on a start subframe of a plurality of subframes. In this case, downlink control information may include information of the number of the plurality of subframes. In a terminal which has received the downlink control information, the information on subframes to which an uplink data channel or a downlink data channel is allocated may be determined based on the information on the start subframe, which are included in the configuration information, and information on the number of subframes, which is the downlink control information (Embodiment 2).

The configuration information may include information on the number of a plurality of subframes. In this case, downlink control information may include information on a start subframe of a plurality of subframes. In a terminal which has received the downlink control information, information on subframes to which a uplink data channel or a downlink data channel is allocated may be determined based on the information on the number of subframes, which is included in the configuration information, and the information on the start subframe, which is included in the downlink control information (Embodiment 3).

The configuration information may include information on the maximum value (e.g., Nmax) of the number of a plurality of subframes. In this case, the downlink control information may include i) information on a start subframe of the plurality of subframes and ii) information on the number of the plurality of subframes. In a terminal which has received the downlink control information, information on subframes to which the uplink data channel or the downlink data channel is allocated may be determined based on the information on the start subframe, which is included in the downlink control information, and the information on the number of subframes (Embodiment 4)

The standard contents or documents referred to in the above-described embodiments of the present disclosure are omitted in order to briefly describe the specification, and form a part of this specification. Accordingly, the addition of the partial contents of the above standard contents or documents to this specification, or the description of the partial contents of the above standard contents or documents in claims should be construed as corresponding to the scope of the present disclosure.

Although the above embodiments of the present disclosure has been described for illustrative purposes, those skilled in the art will appreciate that various modifications and changes are possible, without departing from the essential characteristics of the present disclosure. Therefore, the embodiments disclosed in the present disclosure are not intended to limit a technical idea of the present disclosure but to describe such a technical idea, and the scope of a technical idea of the present disclosure is not limited by the embodiments. The scope of the present disclosure shall be construed on the basis of accompanying claims in such a manner that all technical ideas included within the scope equivalent to the claims belong to the present disclosure.

The invention claimed is:

1. A method for receiving, by a terminal, downlink control information through downlink control channels repeatedly allocated in a plurality of subframes, the method comprising:

receiving configuration information relating to the plurality of subframes through higher layer signaling;

receiving the downlink control channels repeatedly allocated in the plurality of subframes and combining the received downlink control channels on the basis of the configuration information; and extracting the downlink control information from the combined downlink control channels, wherein:

the configuration information comprises information on a start subframe of the plurality of subframes; and the downlink control information comprises information on the number of the plurality of subframes.

2. A method for transmitting, by a base station, downlink control information through downlink control channels repeatedly allocated in a plurality of subframes, the method comprising:
- transmitting configuration information relating to the plurality of subframes through higher layer signaling; and
- transmitting the downlink control information through the downlink control channels repeatedly allocated in the plurality of subframes, wherein:
- the configuration information comprises information on a start subframe of the plurality of subframes; and
- the downlink control information comprises information on the number of the plurality of subframes.

3. A terminal for receiving downlink control information through downlink control channels repeatedly allocated in plurality of subframes, the terminal comprising:
- a receiver configured to receive configuration information comprising information on a start subframe of the plurality of subframes through higher layer signaling, to receive the downlink control channels repeatedly allocated in the plurality of subframes, and to combine the received downlink control channels based on the configuration information; and
- a controller configured to extract downlink control information from the combined downlink control channels,
- wherein the downlink control information comprises information on the number of the plurality of subframes.

\* \* \* \* \*